(12) United States Patent
Amrhein et al.

(10) Patent No.: US 6,779,940 B2
(45) Date of Patent: Aug. 24, 2004

(54) FASTENING DEVICE FOR A LINEAR DRIVE

(75) Inventors: Frank Amrhein, Sindelfingen (DE);
Bernhard Schenk, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/179,032

(22) Filed: Jun. 26, 2002

(65) Prior Publication Data

US 2003/0007828 A1 Jan. 9, 2003

(30) Foreign Application Priority Data

Jun. 27, 2001 (DE) .......................................... 101 30 932

(51) Int. Cl.[7] .............................................. F16C 11/00
(52) U.S. Cl. ......................... 403/71; 403/79; 403/113; 403/119; 403/164
(58) Field of Search ............................ 403/52, 79, 71, 403/112, 113, 119, 120, 164, 165

(56) References Cited

U.S. PATENT DOCUMENTS

| | | | |
|---|---|---|---|
| 1,632,116 A | | 6/1927 | Buss |
| 3,462,179 A | | 8/1969 | Hinkle |
| 3,539,234 A | * | 11/1970 | Rapata ........................ 384/203 |
| 3,641,614 A | * | 2/1972 | Newsome ................. 15/250.32 |
| 4,836,069 A | * | 6/1989 | Tran Dinh ...................... 83/13 |
| 5,211,591 A | * | 5/1993 | Burmeister et al. ........... 440/86 |
| 5,701,677 A | * | 12/1997 | Yamaguchi et al. ......... 33/1 M |
| 6,026,697 A | * | 2/2000 | Krbec et al. ............... 74/89.36 |
| 6,499,906 B1 | * | 12/2002 | Zheng .......................... 403/65 |

FOREIGN PATENT DOCUMENTS

| | | |
|---|---|---|
| DE | 32 28 674 A1 | 2/1984 |
| DE | 43 41 436 C1 | 2/1995 |
| FR | 2734521 | 11/1996 |
| GB | 2 124 732 A | 2/1984 |

* cited by examiner

*Primary Examiner*—Lynne H. Browne
*Assistant Examiner*—Jori Schiffman
(74) *Attorney, Agent, or Firm*—Crowell & Moring LLP

(57) ABSTRACT

A fastening device for pivotably fixing one end of a linear drive to a support part includes a first fastening half disposed at an end of the linear drive and a second fastening half arranged on the support part. The linear drive has an installation position and a functional position, the installed position being inclined at an angle with respect to the functional position. One of the fastening halves includes a U-shaped or L-shaped section. The U-shaped or L-shaped section includes a bolt extending transversely with respect to an axis of the linear drive. The bolt has two mutually parallel, flat outer surfaces, the outer surfaces being disposed on two opposite sides of the bolt and extending parallel to a bolt axis. The other fastening half includes a cylindrical bolt socket having a radial bolt-insertion opening in an insertion direction. When the linear drive is in the installation position, the bolt is insertable into the bolt socket through the bolt-insertion opening with the outer surfaces of the bolt parallel to the insertion direction. When the bolt has been inserted into the bolt socket, the linear drive is pivotable about the bolt axis into the functional position.

21 Claims, 1 Drawing Sheet

FASTENING DEVICE FOR A LINEAR DRIVE

This application claims the priority of German Patent Document No. DE 101 30 932.5, filed Jun. 27, 2001, the disclosure of which is expressly incorporated by reference herein.

BACKGROUND AND SUMMARY OF THE INVENTION

The present invention relates to a fastening device for pivotably fixing one end of a linear drive to a support part. The linear drive can transmit axial tensile and/or compressive forces, and may be, for example, a hydraulic cylinder, pneumatic cylinder, or gas spring.

DE 32 28 674 A1 discloses a fastening device of this type for a gas spring. The device has a first fastening half arranged on the end of the gas spring and a second fastening half arranged on the support part. The first fastening half has a bolt which extends transversely with respect to the force-transmitting direction and has two mutually parallel, flat outer surfaces. The outer surfaces are formed on two opposite sides of the bolt, and extend parallel to the bolt axis and parallel to the force-transmitting direction of the gas spring. The second fastening half has a cylindrical bolt socket which has a radial bolt-insertion opening in one insertion direction. The gas spring has an installation position, which is inclined by 90° with respect to a functional position of the gas spring. In the installation position of the gas spring, the bolt can be inserted with its outer surfaces aligned parallel to the insertion direction, into the bolt socket through the bolt-insertion opening. With the bolt inserted into the bolt socket, the gas spring can be pivoted 90° about the bolt axis into its functional position.

In this known fastening device, the bolt is designed as a separate component which is mounted on the end of the gas spring. In this case, a threaded section of the end of the gas spring extends into the bolt in the force-transmitting direction of the gas spring. Accordingly, the known fastening device requires a relatively large clearance between the bolt socket and support part in order to avoid collisions between the end of the gas spring and support part during installation.

DE 43 41 436 C1 discloses a further fastening device for a gas compression spring, in which the end of the gas compression spring is fixed on a support part. The end of the gas compression spring has a bolt. To fix the end of the gas compression spring to the support part, the end is inserted into a bearing socket in the force-transmitting direction of the gas compression spring. The gas compression spring is subsequently rotated 90° about the axis of its force-transmitting direction into its functional position. Also in this fastening device, the bolt is designed as a separate component which is mounted on the end of the gas compression spring, an axial end of the gas compression spring protrudes over the bolt in the force-transmitting direction. Accordingly, a relatively large clearance is also required between the bearing socket and the support part in order to be able to fit the gas compression spring.

One object of the present invention is to provide a fastening device of the above-mentioned type which can also be used in very tight fitting conditions.

This and other objects and advantages are achieved by certain embodiments of the present invention described hereinafter, in which the bolt preferably is formed using the base of a U-shaped section or using a protruding limb of an L-shaped section, and the respective shaped section preferably is formed on the end of the linear drive or on the support part. If the linear drive is provided with this section, the U-base or the protruding limb or the bolt forms the axial end of the linear drive without further components of the linear drive having to protrude over the bolt. Accordingly, the clearance between the bolt socket and support part can be selected to be relatively small, and the components can be filled in particularly constricted spatial conditions.

While a securing arrangement can be provided in the case of an L-shaped section to prevent the bolt from being pulled out of the bolt socket in the longitudinal direction of the bolt, a securing arrangement of this type is not required in the case of a U-shaped section, since the securing there is performed by the two U-limbs.

In one embodiment of the present invention, the outer surfaces of the bolt can extend transversely with respect to the force-transmitting direction, at least in the functional position of the linear drive. This orientation of the outer surfaces of the bolt assists in obtaining a small clearance between the bolt socket and the element provided therewith, since in the case of the bolt, the clearance between its outer surfaces is smaller than its diameter.

In another advantageous embodiment, the other fastening half can be designed as a C-shaped section having a C-opening. The C-opening forms the bolt-insertion opening. A C-shaped section of this type is also of relatively small dimensions and thus allows the use of the fastening device in constricted fitting conditions.

In another embodiment, the insertion direction can be orientated in such a manner that in its installation position the linear drive is at an inclination, with respect to its functional position, of less than 90° or of less than 60° or of approximately 45°. This particular configuration simplifies the fitting capability of the linear drive in constricted spatial conditions, since the linear drive requires less free space to pivot into its functional position.

The advantages according to the invention are particularly effective if the U-shaped section or the L-shaped section is formed at the end of the linear drive. It is possible to similarly form the respective profiled section on the support part.

It is obvious that the features which have been mentioned above and those which have yet to be explained below can be used not only in the combination specified in each case, but also in other combinations or on their own without departing from the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
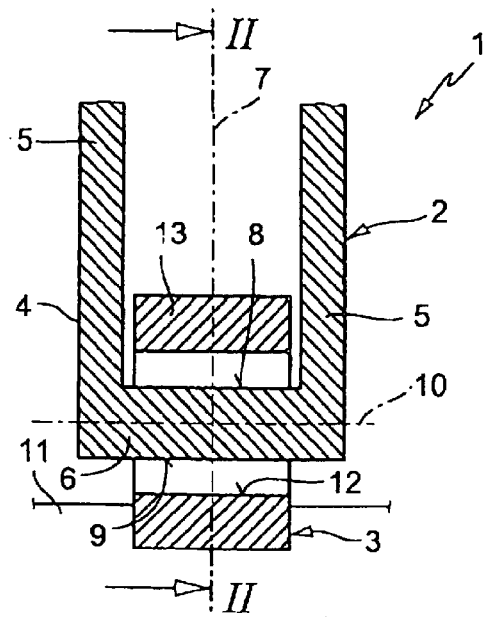
FIG. 1 shows a longitudinal section of a fastening device having a U-shaped section.

As shown in FIG. 1, a fastening device 1 according to the invention has a first fastening half 2 which interacts with a second fastening half 3. The first fastening half 2 is formed on an axial end of a linear drive (not illustrated) which may be, for example, a hydraulic cylinder, a pneumatic cylinder, a gas spring or a gas compression spring. The end of the linear drive has a U-shaped section 4 which has two parallel U-limbs 5 which are connected to each other by a U-base 6. In the fastening device, this U-base 6 includes a bolt which is also assigned reference numeral 6. This bolt 6 extends transversely to a force-transmitting direction 7 of the linear drive, which direction coincides with the longitudinal axis linear drive. The bolt 6 has a first flat outer surface 8 on a side facing the linear drive and a second flat outer surface 9 on a side facing away from the linear drive. The two outer surfaces 8 and 9 are parallel to each other and are on opposite sides of the bolt 6. Furthermore, the two outer surfaces 8 and 9 extend parallel to a bolt axis 10 and transversely with respect to the force-transmitting direction 7.

The second fastening half 3 includes a support part 11 which is generally illustrated and on which the linear drive is to be pivotably fixed. In particular, this support part 11 can be part of a motor vehicle. The second fastening half 3 contains a cylindrical bolt socket 12, the cylinder axis of which runs coaxially with the bolt axis 10. The bolt 8 is mounted pivotably in this bolt socket 12.

Figure 2:
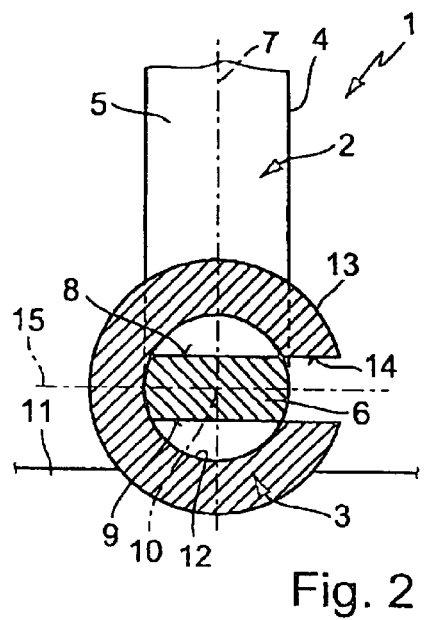
FIG. 2 shows a longitudinal section through the fastening device corresponding to the sectional lines II in FIG. 1 in an installation position of a linear drive.
Figure 3:
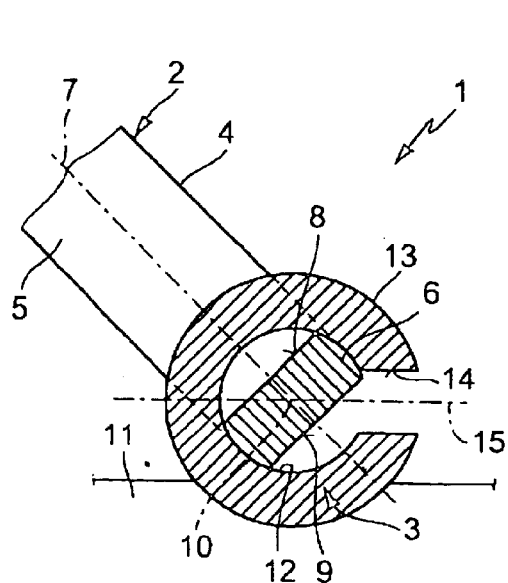
FIG. 3 shows a sectional view as in FIG. 2, but in a functional position of the linear drive.

In FIGS. 2 and 3, the second fastening half 3 has a C-shaped section 13 which is fixed on the support part 11. For example, the C-shaped section 13 is welded onto the support part 11. Similarly, other fastening measures can also be used.

The C-shaped section 13 has a C-opening 14 which forms a radial bolt-insertion opening through which the bolt 6 can be inserted into the bolt socket 12 in the insertion direction 15.

It can be seen from FIGS. 2 and 3 that the bolt 6 has, between its outer surfaces 8 and 9, a cylindrical outer contour which corresponds to the cylindrical inner contour of the bolt socket 12. In this manner, the bolt 6, inserted into the bolt socket 12, can pivot about its bolt axis 10. As a result, the distance between the two outer surfaces 8 and 9 is inevitably significantly smaller than the diameter of the bolt 6. The width of the bolt-insertion opening 14 (C-opening 14) is expediently designed to be slightly larger than the distance between the two outer surfaces 8 and 9 in order to allow the bolt 6 to be inserted into the bolt socket 12.

In FIG. 2, the linear drive assumes an installation position in which the bolt 6 can be inserted, with its outer surfaces 8 and 9 aligned parallel to the insertion direction 15, into the bolt socket 12 through the bolt-insertion opening 14. After the bolt 6 has been inserted into the bolt socket 12, the linear drive is pivoted about the bolt axis 10 into a functional position, which is illustrated in FIG. 3. In the embodiment shown here, this functional position at approximately 45° with respect to the installation position. This arrangement ensures that the bolt 6 can not be removed from the bolt socket 12 during operation of the linear drive.

As shown in FIGS. 2 and 3, a clearance between the bolt 6 and the support part 11 can be very small. As shown in FIG. 3, in the functional position of the linear drive, the bolt 6 can be lowered at one corner within the bolt socket 12 until level with the support part 11. It is similarly possible to arrange the bolt socket 12 in such a manner that part of the bolt 12 below its bolt axis 10 drops below the level of the support part 11. Accordingly, the fastening device 1 requires only a small constructional space. Furthermore, the fastening device 1 also requires a comparatively small fitting space for its installation and removal, and it can therefore be fitted and removed in a relatively simple manner.

These minimal spatial requirements are made possible, inter alia, by the bolt 6 that includes the U-base 6 of the U-shaped section 2, which U-base 6 is connected at its axial ends to the U-limbs 4 and 5. This enables any interfering contour protruding over the bolt 6 in the axial direction of the linear drive to be avoided. As a result, the linear drive can be fixed pivotably in a very close-fitting manner to the support part 11.

Figure 4:
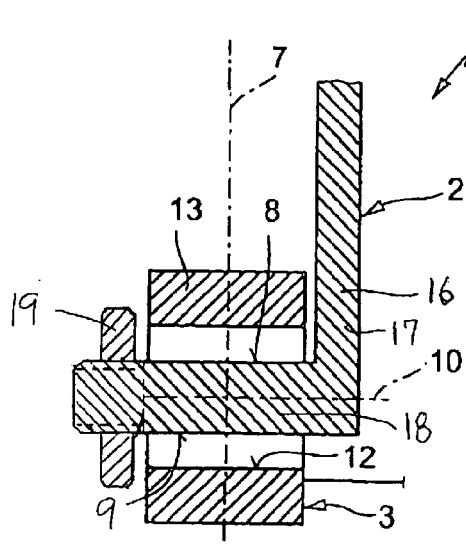
FIG. 4 shows a longitudinal section of a fastening device having an L-shaped section.

In an alternative embodiment shown in FIG. 4, instead of the U-shaped section 4, an L-shaped section 16 can be used, in which one limb 17 is arranged at the end of the linear drive while the other limb 18 ends freely and forms the bolt 18. A securing arrangement 19, such as a splint, a screw, a nut, a clamping washer, can also be fitted on the other limb. The securing arrangement 19 protrudes radially on the bolt in order to prevent the bolt from being inadvertently pulled out of the bolt socket 12 in the longitudinal direction of the bolt.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fastening device for pivotably fixing one end of a linear drive to a support part, the linear drive having an installation position and a functional position, the installed position being inclined at an angle with respect to the functional position, the device comprising:
    a first fastening half disposed at an end of the linear drive;
    a second fastening half arranged on the support part;
    wherein one of the fastening halves includes first and second limbs forming an L-shaped section, the second limb including a bolt extending transversely with respect to an axis of the linear drive, the bolt having two mutually parallel, flat outer surfaces, the outer surfaces being disposed on two opposite sides of the bolt and extending parallel to a longitudinal bolt axis;
    wherein the other fastening half includes a cylindrical bolt socket having a radial bolt-insertion opening in an insertion direction; and
    wherein when the linear drive is in the installation position, the bolt is insertable into the bolt socket through the bolt-insertion opening with the outer surfaces of the bolt parallel to the insertion direction, and wherein when the bolt has been inserted into the bolt socket, the linear drive is pivotable about the bolt axis into the functional position.

2. The fastening device according to claim 1, further comprising a securing arrangement connected to the second limb, the securing arrangement securing the bolt in the bolt socket.

3. The fastening device according to claim 1, wherein the outer surfaces of the bolt extend transversely with respect to the axis of the linear drive, at least when the linear drive is in the functional position.

4. The fastening device according to claim 1, wherein the second fastening half includes a C-shaped section having a C-opening, the C-opening including the bolt-insertion opening.

5. The fastening device according to claim 1, wherein the insertion direction is orientated in such a manner that the angle between the installation and functional positions of the linear drive is less than 90°.

6. The fastening device according to claim 1, wherein the insertion direction is orientated in such a manner that the angle between the installation and functional positions of the linear drive is less than 60°.

7. The fastening device according to claim 1, wherein the insertion direction is orientated in such a manner that the angle between the installation and functional positions of the linear drive is approximately 45°.

8. The fastening device according to claim 1, wherein the L-shaped section is disposed on the end of the linear drive.

9. The fastening device according to claim 1, wherein the L-shaped section is disposed on the support part.

10. The fastening device according to claim 1, wherein the one of the fastening halves further includes a third limb connected to the second limb to form a U-shaped section.

11. The fastening device according to claim 10, wherein the outer surfaces of the bolt extend transversely with respect to the axis of the linear drive, at least when the linear drive is in the functional position.

12. The fastening device according to claim 10, wherein the second fastening half includes a C-shaped section having a C-opening, the C-opening including the bolt-insertion opening.

13. The fastening device according to claim 10, wherein the insertion direction is orientated in such a manner that the angle between the installation and functional positions of the linear drive is less than 90°.

14. The fastening device according to claim 10, wherein the insertion direction is orientated in such a manner that the angle between the installation and functional positions of the linear drive is less than 60°.

15. The fastening device according to claim 10, wherein the insertion direction is orientated in such a manner that the angle between the installation and functional positions of the linear drive is approximately 45°.

16. The fastening device according to claim 10, wherein the U-shaped section is disposed on the end of the linear drive.

17. The fastening device according to claim 10, wherein the U-shaped section is disposed on the support part.

18. The fastening device according to claim 1, wherein the other fastening half includes a cylindrical inner contour, and wherein the bolt has, between its flat outer surfaces, a cylindrical outer contour which is slightly smaller than the cylindrical inner contour of the other fastening half.

19. The fastening device according to claim 18, wherein the distance between the two outer surfaces is smaller than the diameter of the cylindrical outer contour of the bolt.

20. The fastening device according to claim 1, wherein the width of the bolt-insertion opening of the other fastening half is larger than the distance between the two outer surfaces of the bolt.

21. The fastening device according to claim 1, wherein one of the flat outer surfaces of the bolt faces the linear drive.

* * * * *